United States Patent Office 3,349,061
Patented Oct. 24, 1967

3,349,061
AMIDE-ESTER ISOMERS
Gerfried Pruckmayr, Wilmington, Del., assignor to E. I. du Pont de Nemours and Company, Wilmington, Del., a corporation of Delaware
No Drawing. Filed Mar. 2, 1964, Ser. No. 348,818
6 Claims. (Cl. 260—47)

This application is a continuation-in-part of my application Ser. No. 336,870, filed Jan. 10, 1964, now abandoned.

This invention relates to polyimide precursors, and more particularly, to meltable polyimide precursors which are especially suitable for use as metal adhesives.

The fully polymerized aromatic polyimides are known to have remarkable chemical and thermal stability. Because of these properties, it is extremely difficult to shape these polyimides into useful articles, or to apply them as coatings. Several polyimide precursors have been developed which are shapable and which can be readily converted into polyimides. Thus, certain polyamide-acids, polyamide-esters, and polyamide-amides have enabled these aromatic polyimides to attain practical commercial utility.

However, the polyimide precursors prepared heretofore suffer certain deficiencies. The polyamide-acids in some instances are not storage-stable, being partially degraded at room temperature over extended periods of time. To thermally convert the polyamide-acids to polyimides, extremely high temperatures are required for complete reaction. The polyamide-esters and polyamide-amides are more stable than the polyamide-acids, and they are readily converted into the polyamides. However, most of these prior polyimide precursors are either not meltable, or can be melted only with great difficulty. On exposure to heat, instead of melting they are normally converted directly to the polyimide. Furthermore, they are soluble only in certain high-boiling liquid organic compounds, and are insoluble in the desirable common low-boiling organic solvents.

An object of this invention is to provide improved polyimide precursors. Another object is to provide improved storage-stable, meltable polyimide precursors. A further object is to provide improved storage-stable, meltable polyimide precursors which are soluble in common organic solvents, and which may be readily converted into fully polymerized aromatic polyimides. An additional object is to provide improved storage-stable, meltable polyimide precursors which are soluble in common organic solvents, may be readily converted to the fully polymerized aromatic polyimides, and which are especially suitable for use as metal adhesives.

These and other objects are attained by the present invention which provides the composition comprising a mixture of amide-ester isomers having the structure:

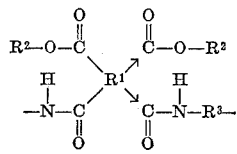

wherein:
the arrows denote isomerism (i.e., in any structural unit the groups to which the arrows point may exist as shown or in interchanged positions),
$R^1$ is an aromatic tetravalent radical, the four carbonyl groups being attached directly to separate carbon atoms in at least one aromatic ring, and each pair of carbonyl groups being in a position selected from the group consisting of ortho and peri,
$R^2$ is a radical selected from the group consisting of aryl and alkyl, and
$R^3$ is an aromatic divalent organic radical wherein the carbon atoms to which the amino groups are attached are separated by at least one other carbon atom, said mixture being meltable and having an inherent viscosity of less than 0.2.

These mixtures of amide-ester isomers are prepared by the controlled melt reaction of certain aromatic esters and aromatic diamines described in detail hereinafter. The aromatic esters used in this invention are characterized by the formula:

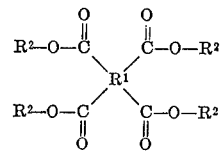

wherein $R^1$ is an aromatic tetravalent organic radical, such as,

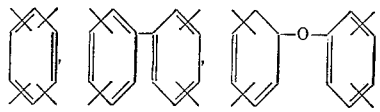

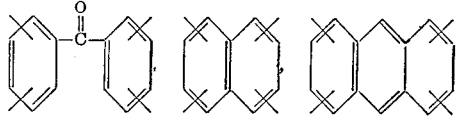

and the like, with the four carbonyl groups being attached directly to separate carbon atoms in an aromatic ring, and each pair of carbonyl groups being in the ortho position to each other, i.e.,

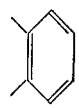

or the peri position, i.e.,

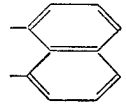

$R^2$ is either an aryl radical, such as, phenyl, biphenyl, napthyl, cresyl, dichlorophenyl, etc. or an alkyl radical such as methyl, ethyl, butyl, etc. Preferably, $R^2$ is phenyl. Illustrative aromatic esters suitable for use in this invention include tetraphenyl benzophenone-3,3',4,4'-tetracarboxylate,
tetranaphthyl benzophenone-3,3',4,4'-tetracarboxylate,
tetraethyl benzophenone-3,3',4,4'-tetracarboxylate,
tetraphenyl-3,3',4,4'-oxydiphthalate,
tetraphenyl pyromellitate,
tetramethyl pyromellitate,
tetracresyl pyromellitate,
tetrabutyl diphenylmethane-3,3',4,4'-tetracarboxylate,
tetra m-chlorophenyl diphenymethane-3,3',4,4'-tetracarboxylate,
tetra p-chlorophenyl diphenymethane-3,3',4,4'-tetracarboxylate,
tetra (biphenyl) chlorophenyl diphenylmethane-3,3',4,4'-tetracarboxylate,
tetraphenyl diphenyl difluoromethane-3,3',4,4'-tetracarboxylate, tetra m-ethoxyphenyl diphenyl sulfone-3,3',4,4'-tetracarboxylate,
tetra p-ethoxyphenyl diphenyl sulfone-3,3',4,4'-tetracarboxylate,
tetraphenyl diphenyl-3,3',4,4'-tetracarboxylate,
tetracresyl diphenyl-2,3,3',4'-tetracarboxylate,
tetraphenyl naphthalene-1,4,5,8-tetracarboxylate and the tetraesters of 2,2-bis(3,4-dicarboxyphenyl) propane, and 2,2-bis(3,4-dicarboxyphenyl)-1,1,1,3,3,3-hexafluoropropane,
tetraphenyl-2,3,6,7-naphthalene tetracarboxylate,
tetraphenyl-3,4,9,10-perylene tetracarboxylate,
tetraphenyl 2,6-dichloronaphthalene-1,4,5,8-tetracarboxylate,
tetraphenyl-2,3,6,7-tetrachloronaphthalene-1,4,5,8-tetracarboxylate,
tetraphenyl phenanthrene - 1,8,9,10 - tetracarboxylate, and the like. More than one of such aromatic esters can be used if desired. Tetraphenyl benzophenone - 3,3',4,4'-tetracarboxylate and tetraphenyl pyromellitate, either alone or in combination together are the preferred aromatic esters.

The aromatic diamines used in this invention are characterized by the formula: $H_2N-R^3-NH_2$ wherein $R^3$ is an aromatic divalent radical wherein the carbon atoms to which the amino groups are attached are separated by at least one other carbon atom, such as phenylene, naphthylene, biphenylene, anthrylene, furylene, benzfurylene, and

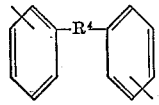

wherein $R^4$ is a member of the group consisting of

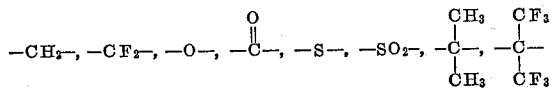

and the like. Examples of suitable aromatic diamines include m-phenylenediamine,
p-phenylenediamine,
oxydianiline,
methylene dianiline,
hexafluoroisopropylidene dianiline,
α,α'-diamino-m-xylene,
α,α'-diamino-p-xylene,
1,4-naphthylenediamine,
1,5-naphthylene-diamine,
2,6-naphthylenediamine,
2,7-naphthylenediamine,
2,2'-bis(4-aminophenyl) propane,
2,2'-bis(aminophenyl) hexacuoropropane,
4,4'-diamino diphenylsulfone,
3,3'-diamino diphenylsulfone,
4,4'-diaminodiphenylether,
benzidine,
3,3'-dichlorobenzidine,
3,3'-dimethoxybenzidine,
3,3'-dimethylbenzidine,
3,4'-diamino-biphenyl,
4,4'-diaminobenzophenone, and the like. The preferable diamines are those which possess inherent thermal stability. More than one diamine can be used if desired.

The mixtures of amide-ester isomers of this invention are prepared by heating the aromatic ester and aromatic diamine together to obtain a melt. Preferably, the aromatic ester and aromatic diamine are first mixed together in the form of finely divided solid particles. Usually, the aromatic ester and aromatic diamine are reacted in a mole ratio of diamine to ester of from about 0.9:1 to 1.5:1, or preferably from 1:1 to 1.2:1. After the starting materials have melted, the heating of the molten mixture is continued, normally at a temperature of from about 200 to 300° C. The heating is discontinued before the inherent viscosity of the reaction product exceeds 0.2, measured as a 0.5% solution in any suitable solvent at 30° C. according to the procedure specified in ASTM D-1601, or preferably, the heating is discontinued when the inherent viscosity of the mixture reaches from 0.04 to 0.12. The cooled product is obtained in the form of a solid material which may be subsequently used as a finely divided powder.

It is known that these products are mixtures of amide-ester isomers having the recurring structure:

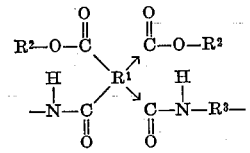

wherein the arrows denote isomerism, $R^1$ is an aromatic tetravalent organic radical, $R^2$ is aryl or alkyl, and $R^3$ is an aromatic divalent radical, all as defined hereinbefore. The term "mixture of amide-ester isomers" refers to a mixture of positional isomer units, each having the recurring structure shown above. In any one given amide-ester molecule, the individual structural units may be the same or different isomers. However, the over-all mixture is composed of all possible positional isomers. Such a mixture of isomers may be illustrated by the product derived from a benzophenone - 3,3',4,4' - tetracarboxylate tetra ester:

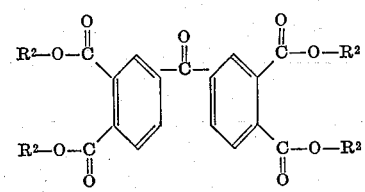

and an aromatic diamine of the general formula $H_2N-R^3-NH_2$, which provides a mixture containing amide-ester isomers having the structures:

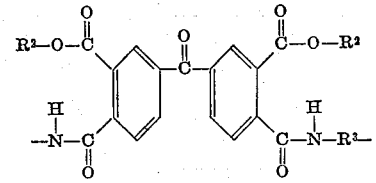

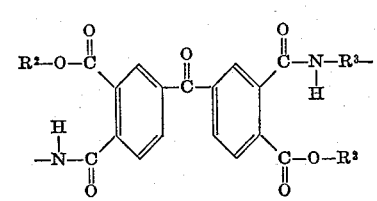

and

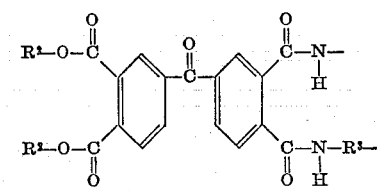

In addition to this mixture of amide-ester isomers, in some instances, particularly where an excess of diamine is reacted with the aromatic ester, there is also obtained a amide-ester having the structure:

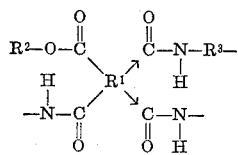

and an amide-amide having the structure:

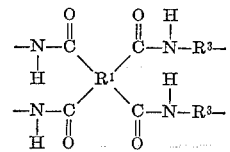

However, in every instance the composition of this invention is predominantly composed of the aforedescribed mixture of amide-ester isomers. This product does not contain any substantial amount of imide compounds which are detectable by infrared analysis.

The molecular weights of these mixtures of amide-ester isomers are low, having inherent viscosities of less than 0.2 and preferably from 0.04 to 0.12. It is believed that these mixtures of amide-ester isomers are also mixtures of primarily monomers, dimers and trimers, that is, isomers wherein one, two, or three of the aforedescribed amide-ester isomer structures compose a single molecule. In most instances, the products of this invention also contain longer chain molecules, that is, tetramers, pentamers, and higher molecular weight molecules, and also some unreacted starting components.

Another characteristic of the compositions of this invention is that these mixtures of amide-ester isomers are meltable. That is, they have definite, although not necessarily sharp, melting points. Usually the melting points are from 50 to about 200° C., or preferably, 75 to 150° C. The mixtures of amide-ester isomers of this invention are very storage-stable, being capable of indefinite storage at room temperature without any significant product degradation.

The compositions of this invention are strikingly different from the polyamide-esters prepared heretofore. Previously, polyamide-esters were prepared by reacting certain diacyl halides, namely, dicarboalkoxy or dicarboaryloxy aryl dicarboxy halides, with a primary aromatic diamine. Such a process produces essentially a single polyamide-ester isomer and not a mixture of polyamide-ester isomers. Also, the polyamide-ester produced by such a process is a high molecular weight polymer, having an inherent viscosity of preferably 0.3 to 5.0, whereas the mixture of amide-ester isomers of this invention has a low molecular weight, having an inherent viscosity of less than 0.2. The prior art polyamide-esters are generally linear, long-chain polymers, while the mixtures of amide-ester isomers of this invention consist of very short molecular chain units, wherein the chains which have a multiplicity of recurring characteristic structural units usually, but not necessarily always, possess chain branching. Furthermore, the prior art polyamide-esters either are not meltable or can be melted only with great difficulty. When subjected to heat, usually they are converted directly into polyimides without the formation of a melt. Not only are the mixtures of amide-ester isomers of this invention meltable, but they can be maintained in a molten state for an appreciable length of time without any significant formation of polyimides. Moreover, the prior art polyamide-esters generally are soluble only in high boiling organic liquids, whereas the mixtures of amide-ester isomers of this invention are also soluble in many common low boiling organic solvents.

The compositions of this invention can be converted into the corresponding fully polymerized polyimides by subjection to heat. The reaction time required to convert the mixtures of amide-ester isomers into the polyimide depends primarily upon the temperature used. When these compositions are heated to temperatures relatively close to the melting point thereof, usually less than about 200° C., the conversion rate is very slow, thus permitting the practical use of this composition in a molten state. At temperatures above 250° C., or preferably from 275 to 325° C., the conversion rate to the polyimide is markedly increased. The polyimides thus formed are characterized as having the recurring structure:

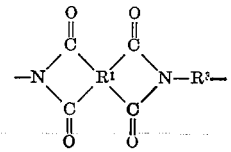

wherein $R^1$ is an aromatic tetravalent organic radical, and $R^3$ is an aromatic divalent radical, as defined above.

The compositions of this invention may be used in the same manner as any of the conventional polyimide precursors. Furthermore, being meltable, the compositions of this invention possess even more utility. When melted, these compositions become very fluid, and may be easily flowed onto surfaces, into crevasses, molds, forms, and the like, thus permitting applications not possible with conventional polyimide precursors.

The compositions of this invention may be shaped into useful articles of manufacture such as filaments, films, tubes, rods, and the like, and then converted to the polyimide. If desired, inert materials may be added before or after shaping. Such fillers include pigments, electrically conductive carbon black, metal particles, abrasives, dielectrics, and lubricating polymers. Cellular products, such as foams, may be produced by the use of conventional blowing agents or by dispersing bubbles of a suitable gas, such as air, carbon dioxide, nitrogen, etc. into a melt or solution of these mixtures of amide-ester isomers.

The compositions of this invention also are useful as coating compositions. Such a composition may be used as a hot melt or as a solution of the product in a suitable solvent such as dioxane, tetrahydrofuran, methylene chloride, chloroform, pyridine, hexamethylene phosphoramide, dimethyl sulfoxide, dimethyl formamide, dimethyl acetamide, and the like. The usual techniques of application such as brushing, spraying, rolling, dipping, doctoring, and the like may be used to apply such coating compositions to a wide variety of substrates including steel, aluminum, copper, brass, and other metals in the form of sheets, fibers, wires, screening; mineral structures such as asbestos; glass in the form of sheets, fibers, foams, fabrics, and the like; polymeric materials such as cellulosic, polyolefins, polyesters, polyamides, polyimides, polyfluorocarbons, polyurethanes, in the form of sheets, fibers, films, fabrics, screening, etc.; leather sheets and the like.

The mixtures of amide-ester isomers of this invention are especially useful as adhesives for metal substrates. These compositions form tenacious bonds on a wide variety of metals such as copper, brass, aluminum, titanium, molybdenum, and steel, including the various stainless steels which are normally considered to be very difficult to bond together with organic adhesives. Where the surfaces to be adhered together are in a horizontal plain, the compositions of this invention may be used as finely divided powder, by sprinkling the powder on one of the surfaces, and bringing the second surface into contact therewith and then subjecting the laminate to heat treatment to convert the amide-ester product to the polyimide. Alternately, the compositions of this invention may be used as hot melts. Also, these compositions may be dissolved in a suitable solvent to prepare a solution or may be blended with a sufficient amount of solvent to form a paste or dough which may be conveniently applied to the surfaces to be adhered. In addition, an adhesive tape may be prepared by impregnating a glass fiber cloth or the like with a paste of a mixture of amide-ester isomers which is then air-dried to remove solvent. This tape then may be used as a heat-sensitve adhesive. After the compositions of this invention have been applied to the metal surfaces, and converted to the polyimide, very strong bonds are formed which possess remarkable chemical and thermal resistance.

Particularly useful adhesive materials may be obtained by blending the compositions of this invention with a polybenzimidazole precursor obtained by reacting certain aromatic esters with certain aromatic tetraamines. The aromatic esters may be either difunctional, having the formula

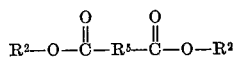

or trifunctional, having the formula

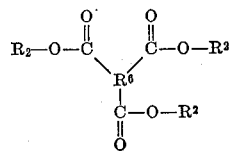

wherein these formulae, $R^5$ is an aromatic divalent radical, and $R^6$ is an aromatic trivalent radical, wherein both formulae the carbonyl groups are attached directly to separate carbon atoms in an aromatic ring, with these carbon atoms each being separated by at least one other carbon atom, and $R^2$ being an aryl radical, preferably phenyl, as described hereinbefore. The aromatic tetraamines have the formula

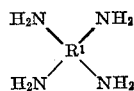

with $R^1$ being an aromatic tetravalent organic radical as described hereinbefore. Particularly preferred esters are diphenylisophthalate, diphenylterephthalate, and triphenyltrimesate, and a preferred tetraamine is 3,3'-diaminobenzidine.

These aromatic esters and aromatic tetraamines are reacted in the melt until the resulting product has an inherent viscosity of 0.04 to 0.12 measured as a 0.5% solution in any suitable solvent at 30° C. according to the procedure specified in ASTM D-1601. These starting materials are reacted in an ester to tetraamine molar ratio of 1:0.09 to 1:1.4, or preferably 1:1. The resulting polybenzimidazole precursor usually has a melting point within the range of 150 to 170° C. These blends of polybenzimidazole precursor and amide-ester isomer mixture preferably should contain about 60 to 90%, by weight, of the amide-ester isomer mixture, with optimum results usually being obtained with such blends containing about 75%, by weight, of the amide-ester isomer mixture. These blends may then be used as adhesives in the same manner as described above as with the compositions of this invention when used alone. These blends are converted to a polyimide-polybenzimidazole mixture upon subjection to heat, preferably at temperatures above 250° C., or especially from 275 to 325° C.

This invention is further illustrated by the following examples:

Example 1

A powdered mixture of 0.662 gram (1 m.-mole) of tetraphenyl benzophenone-3,3',4,4'-tetracarboxylate and 0.200 gram (1 m.-mole) of oxydianiline was prepared in a mortar. This mixture was placed in a large test tube. The air in this test tube was replaced with nitrogen, and a slow stream of nitrogen was passed through the test tube throughout the subsequent reaction. This test tube was immersed in an oil bath preheated to 230° C. The powdered starting materials formed a clear brown melt. Phenol was evolved during this heating cycle, and the viscosity of the melt gradually increased. After heating at 230° C. for 30 minutes, the test tube was removed from the oil bath and cooled in air. The melt solidified to a brown glassy material, which was powdered in a mortar. By chromatographic analysis, this product was determined to be a mixture of amide-ester isomers derived from the starting components which had a melting point of 110–120° C., and an inherent viscosity of 0.06. Quantitative chemical analysis showed this product contained 73.75 weight percent carbon, 3.91% hydrogen and 3.41% nitrogen. The infrared spectrum of this product showed no imide absorption bands.

Example 2

This example illustrates the use of the mixture of amide-ester isomers of this invention as an adhesive. Strips of stainless steel, 1 inch x 3 inches, were prepared by the procedure described as Method I by Guttman, Concise Guide to Structural Adhesives, Reinhold Publishing Corp., New York (1961), p. 21. The powdered product of Example 1 was mixed with aluminum dust in a weight ratio of 1:1. This mixture was applied to about a ½ inch segment of the end of the strip. Another strip was brought into abutting contact therewith to provide a 0.5 inch overlap. This assembly was heated to about 300° for 2 hours under a constant pressure of 200 p.s.i. which converted the mixture of amide-ester isomers to the corresponding fully polymerized polyimide. The shear strength of the bond was 2600 p.s.i. at room temperature, as determined by ASTM D 1002.

Example 3

A powdered mixture of 0.662 gram of tetraphenyl benzophenone-3,3',4,4'-tetracarboxylate and 0.297 gram (1.5 m.-moles) of methylene dianiline was prepared and reacted in the melt as shown in Example 1. The product was a mixture of amide-ester isomers of the reactants, having a melting point of 95–120° C. and an inherent viscosity of less than 0.12. Adhesive bond strengths using stainless steel were determined as shown in Example 2. The shear strength at room temperature was 2100 p.s.i., and at 290° C. was 1400 p.s.i.

Example 4

A powdered mixture of 0.331 gram (0.5 m.-mole) of tetraphenyl benzophenone-3,3',4,4'-tetracarboxylate and 0.168 gram (0.5 m.-mole) of hexafluoroisopropylidene dianiline was prepared and reacted in the melt as shown in Example 1. The mixture of amide-ester isomers had a melting point of 80–85° C. and an inherent viscosity of less than 0.12. The bond strengths of the corresponding polyimide of this product were evaluated as shown in Example 2, heating the assembly at 270° C. for 30 minutes and then at 300° C. for one hour. The lap shear strength was 1700 p.s.i. at room temperature.

Example 5

A powdered mixture of 0.662 gram of tetraphenyl benzophenone-3,3',4,4'-tetracarboxylate and 0.316 gram 1.4 m.-moles) of isopropylidene dianiline was prepared and reacted in the melt as shown in Example 1. The mixture of amide-ester isomers had a melting point of 130–150° C. and an inherent viscosity of less than 0.12. Bond strengths were determined as shown in Example 2, heating the assembly at 300° C. for 1.5 hours under 200 p.s.i. The lap shear strength at room temperature was 2400 p.s.i.

Example 6

A powdered mixture of 0.785 gram (1.2 m.-moles) of tetraphenyl benzophenone-3,3',4,4'-tetracarboxylate and 0.192 gram (1.4 m.-moles) of diamino-m-xylene was prepared as shown in Example 1, heating at 210° C. for five minutes. The mixture of amide-ester isomers had a softening point of 120° C. and an inherent viscosity of less than 0.12.

Example 7

A powdered mixture of 0.331 gram (0.5 m.-mole) of tetraphenyl benzophenone-3,3',4,4'-tetracarboxylate and 0.347 gram (0.7 m.-mole) of diamino diphenylsulfone was prepared and reacted as shown in Example 1, heating at 230° C. for 20 minutes and then for 40 minutes under 10 mm. vacuum. The mixture of amide-ester isomers had a melting point of 75–82° C. and an inherent viscosity of less than 0.12.

Example 8

A powdered mixture of 0.662 gram (1 m.-mole) of tetraphenyl benzophenone-3,3',4,4'-tetracarboxylate and 0.220 gram (1 m.-mole) of benzidine was prepared and reacted as shown in Example 1, at 230° C. for 20 minutes, to yield a mixture of amide-ester isomers having a melting point of 90–120° C., and an inherent viscosity of less than 0.12. Bond strengths were determined as shown in Example 2. The lap shear strength at room temperature was 1400 p.s.i. and at 300° C. was 1200 p.s.i.

Example 9

A powdered mixture of 39.72 grams of tetraphenyl benzophenone-3,3',4,4'-tetracarboxylate, 33.48 grams of tetraphenyl pyromellitate, and 30.00 grams of oxydianiline was prepared and charged to a 500 ml. reaction kettle. The air was evacuated from the kettle, and the kettle was then flushed with nitrogen. A slow stream of nitrogen was flowed through the kettle during the subsequent reaction. The kettle was heated to a constant inside temperature of 210° C. and maintained for 40 minutes, during which time the resulting melt was stirred. The reaction product cooled to room temperature, formed a glassy material which was powdered. This product was a mixture of amide-ester isomers of the starting reactants, and had a melting point of 100° C. and an inherent viscosity of 0.08. The bond strengths of this product were determined as shown in Example 2, heating the assembly at 275° C. for 1.5 hours and then at 310° C. for 45 minutes under 200 p.s.i. The lap shear strength at room temperature was 3100 p.s.i., and at 300° C. was 1300 p.s.i.

Example 10

A powdered mixture of 0.558 gram (1 m.-mole) of tetraphenyl pyromellitate and 0.297 gram (1.5 m.-moles) of oxydianiline was prepared and reacted as shown in Example 1. The mixture of amide-ester isomers had a softening point of 125° C. and an inherent viscosity of less than 0.12. The bond strength of this product was determined as shown in Example 2, heating the assembly at 310° C. for one hour and then at 390° C. for one hour. The lap shear strength at room temperature was 1450 p.s.i.

Example 11

A powdered mixture of 0.558 gram of tetraphenyl pyromellitate and 0.184 gram (1 m.-mole) of benzidine was prepared and reacted as shown in Example 1. The product was a mixture of amide-ester isomers of the reactants having a melting point of 147–165° C. and an inherent viscosity of 0.06.

Example 12

A powdered mixture of 0.662 gram (1 m.-mole) of tetraphenyl benzophenone-3,3',4,4'-tetracarboxylate and 0.108 gram (1 m.-mole) of p-phenylenediamine was prepared and reacted as shown in Example 1 at 230° C. for 20 minutes. The mixture of amide-ester isomers had a melting point of 140–147° C. and an inherent viscosity of 0.04.

Example 13

A powdered mixture of 0.309 gram (1 m.-mole) of tetramethyl pyromellitate and 0.198 gram (1 m.-mole) of oxydianiline was prepared and reacted as shown in Example 1, at 210° C. for 15 minutes. The resulting mixture of amide-ester isomers had a softening point of 182–200° C. and an inherent viscosity of less than 0.2.

Example 14

A powdered mixture of 1,300 grams (2 m.-moles) of tetraphenyl-3,3',4,4'-diphenyloxide tetracarboxylate and 0.600 gram (3 m.-moles) of oxydianiline was prepared and reacted as shown in Example 1, at 230° C. for 20 minutes and then at 240° C. for 15 minutes. The resulting mixture of amide-ester isomers had a melting point of 120–143° C., and an inherent viscosity of 0.11. The bond strength was 1900 p.s.i. at room temperature, determined as shown in Example 2.

Example 15

A powdered mixture of 1.300 grams (2 m.-moles) of tetraphenyl-3,3',4,4'-diphenyloxide tetracarboxylate and 0.216 gram (2 m.-moles) of methaphenylene diamine was prepared and reacted as shown in Example 1, at 230° C. for 30 minutes, to yield a mixture of amide-ester isomers having a softening point of about 70° C., and an inherent viscosity of 0.20.

Example 16

A powdered mixture of 0.650 gram (1 m.-mole) of tetraphenyl-3,3',4,4'-diphenyloxide tetracarboxylate, 0.558 gram (1 m.-mole) of tetraphenyl pyromellitate, and 0.500 gram (2.5 m.-moles) of oxydianiline was prepared and reacted as shown in Example 1. The resulting mixture of amide-ester isomers had a softening point of 220° C. and an inherent viscosity of less than 0.2. Bond strengths were determined as shown in Example 2. The lap shear strength at room temperature was 2100 p.s.i. and at 300° C. was 1400 p.s.i.

It is apparent that many modifications of the present invention, as herein described, may be made without departing from the spirit and scope of this invention. Therefore, it is not intended for this invention to be limited except as defined by the following claims.

I claim:

1. A meltable polyimide precursor having a melting point of 50–200° C., predominantly composed of a mixture of amide-ester isomers consisting essentially of one or more units corresponding to the formula:

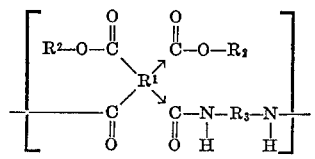

wherein:
the arrows denote isomerism;
$R^1$ is a tetravalent radical having at least one aromatic carbocyclic ring, each carbonyl group being directly attached to a different carbon atom of an aromatic carbocyclic ring of $R^1$ in a position ortho or peri to another carbonyl group;
$R^2$ is alkyl or aryl; and
$R^3$ is an aromatic divalent radical, the amine groups being directly attached to different $R^3$ carbon atoms which are separated by at least one other carbon atom.

2. A precursor according to claim 1 wherein $R^2$ is aryl.

3. A precursor according to claim 2 wherein $R^2$ is phenyl.

4. A precursor according to claim 3 wherein $R^1$ is

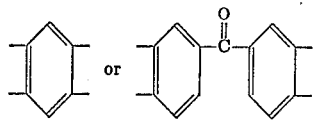

and R³ is phenylene, naphthalene, biphenylene, furylene, benzfurylene or

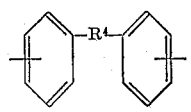

wherein

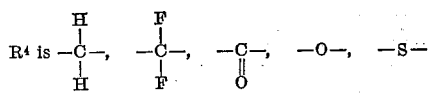

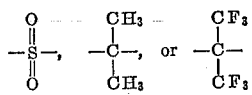

5. A precursor according to claim 4 which melts at 75° C. to 150° C. and wherein R³ is

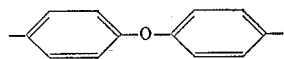

6. A precursor according to claim 5 wherein said isomers comprise a first species having R¹ as

and a second species having R¹ as

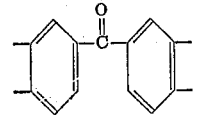

References Cited
UNITED STATES PATENTS

| | | | |
|---|---|---|---|
| 3,179,634 | 4/1965 | Edwards | 260—78 |
| 3,261,811 | 7/1966 | Tatum | 260—78 |
| 3,264,250 | 8/1966 | Gall | 260—78 |
| 3,282,897 | 11/1966 | Angelo | 260—78 |

FOREIGN PATENTS

| | | |
|---|---|---|
| 570,858 | 7/1945 | Great Britain. |
| 898,651 | 6/1962 | Great Britain. |

WILLIAM H. SHORT, *Primary Examiner.*

H. D. ANDERSON, *Assistant Examiner.*